United States Patent [19]

Lace

[11] B 3,915,365

[45] Oct. 28, 1975

[54] CARTRIDGE TAPE PLAYER DRIVE SYSTEM

[75] Inventor: Melvin A. Lace, Prospect Heights, Ill.

[73] Assignee: Motorola, Inc., Chicago, Ill.

[22] Filed: Dec. 26, 1972

[21] Appl. No.: 318,618

[44] Published under the Trial Voluntary Protest Program on January 28, 1975 as document no. B 318,618.

[52] U.S. Cl. .................. 226/178; 310/83; 310/156; 318/327

[51] Int. Cl.$^2$ .......................................... B65H 17/22

[58] Field of Search ............... 226/42, 24, 188, 178; 274/4 D, 11 F; 318/326, 327; 310/83, 156

[56] References Cited

UNITED STATES PATENTS

| | | | |
|---|---|---|---|
| 3,022,383 | 2/1962 | Springer | 310/83 X |
| 3,612,375 | 10/1971 | Baba | 226/188 |
| 3,657,624 | 4/1972 | Nagano | 318/327 X |

*Primary Examiner*—Richard A. Schacher

*Attorney, Agent, or Firm*—Donald J. Lisa; James W. Gillman

[57] ABSTRACT

A tape drive system for a cartridge tape player having a small thickness includes a DC motor which has a stator with a plurality of field windings, and a rotor with a permanently magnetized ring magnet coaxially surrounding the stator. Brushes on the rotor engage contacts on the stator to energize the field windings in sequence. A drive wheel connected to the rotor is coupled by a drive belt to a capstan pulley, which is larger than the drive wheel, to drive the capstan of the tape drive system, with the faster rotating rotor providing a flywheel effect to stabilize the drive. A tachometer generator includes a ring gear which is connected to the rotor and has a large number of teeth around its periphery cooperating with segments of a coaxial ring magnet. A pickup coil adjacent the ring magnet is connected to a control circuit which is coupled to the motor field windings to energize the same, with the control circuit changing the drive current to compensate for incremental changes in motor speed.

24 Claims, 4 Drawing Figures

FIG. 1
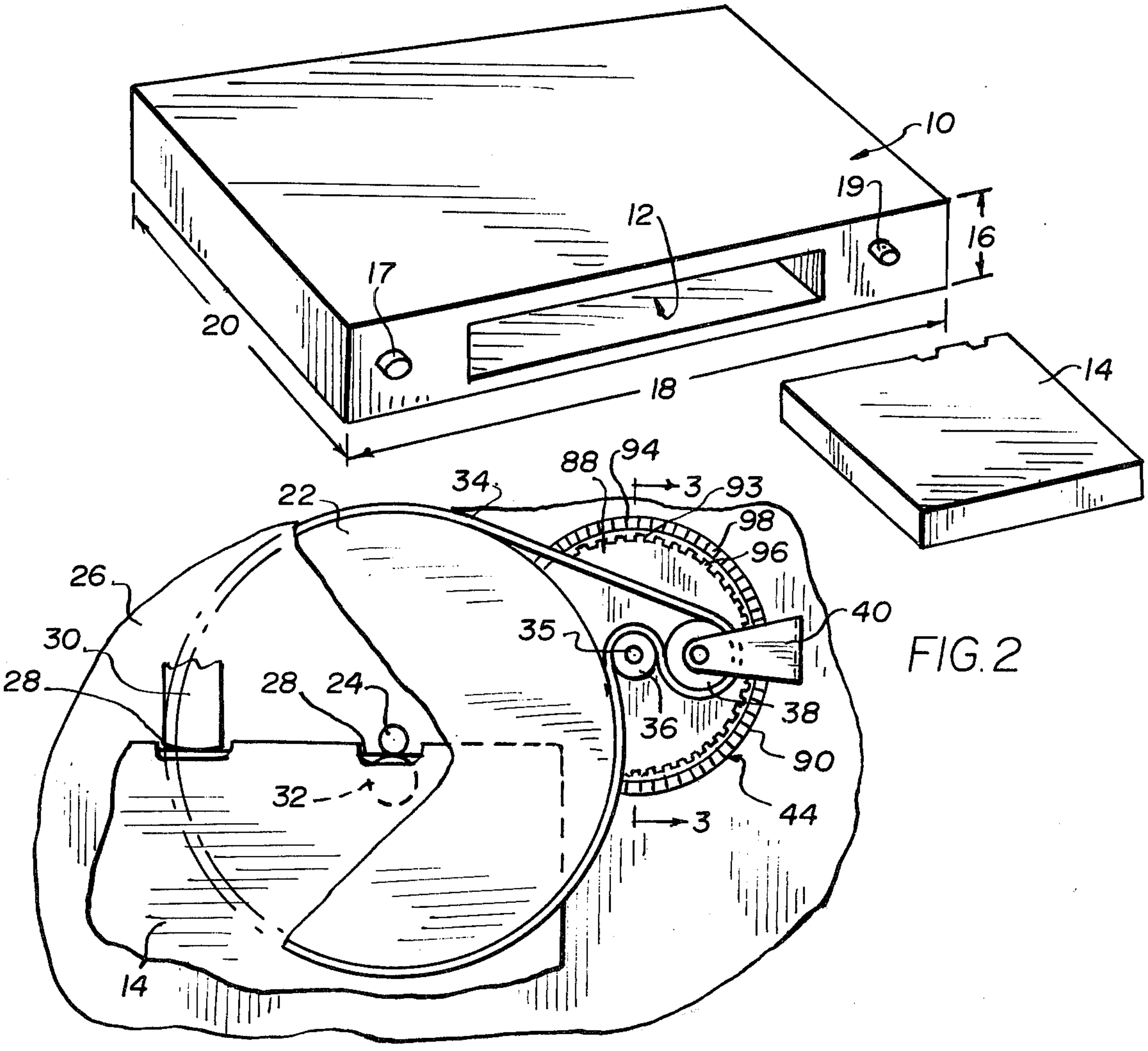
FIG. 1, FIG. 2
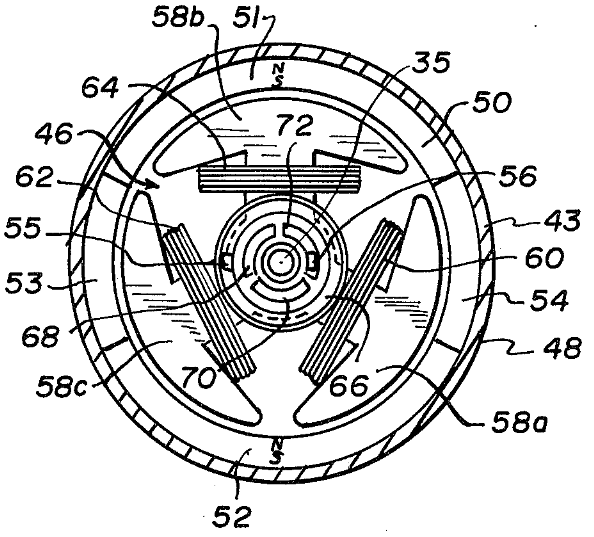
FIG. 4

CARTRIDGE TAPE PLAYER DRIVE SYSTEM

BACKGROUND OF THE INVENTION

Cartridge tape players ordinarily require housings three to four inches thick to provide room for the cartridge, the drive system and other components of the tape player. In automobiles, the thickness of such housings has presented a problem since tape players are commonly mounted below the dashboard and consequently intrude into the passenger leg area. Secondly, it is desired to miniaturize cartridge tape players as other electronic equipment has been miniaturized in recent years. Portable radio and television receivers, and phonographs, for example, already have been greatly reduced in size to improve their portability.

One problem encountered in reducing the thickness of a tape player is the necessity of a large flywheel for maintaining constant tape drive speed. Ordinarily flywheels of tape drive systems are of the order of 4 to 5 inches in diameter and one-fourth to one-half inch thick. The flywheel acts as an energy storage unit and is necessary to maintain substantially constant tape drive speed for good sound quality in the presence of changes in the torque requirements of the drive motor. Such changes in torque may result from tape shuffle, or a momentary hangup caused by the tape sticking to the capstan, a tape splice, or a sticky pressure roller bearing, for example.

In view of the necessity of energy storage, and of providing enough torque for rapid acceleration to operational speed, there has been a problem in reducing the size of drive systems including the drive motor and flywheel. Available motors have had an axial dimension which prevents use in a housing having a small vertical dimension. In addition, complex circuitry has been required to supply sufficient current to first accelerate the drive to operational speed, and then limit the current to the operating value without causing oscillations in the motor supply which would show up in the operation of the tape drive.

In one device which addresses the problem of reducing motor size, a wound rotor surrounds a stator formed of a permanent magnet or magnetizable material. Although the arrangement permits some reduction in motor size for supplying the same power, a flywheel is still required to provide the required drive stability.

Efficient speed control systems which provide stability and constant motor speed over a variety of temperature conditions present another problem. One particular motor control device which has been suggested for maintaining substantially constant control over a range of temperature utilizes a tachometer device with a disc-shaped permanent magnet rotor which rotates coaxially within the field of the motor. This particular device, however, does not result in a drive which is suitable for use in a tape player of the desired size and shape.

SUMMARY OF THE INVENTION

It is an object of the present invention to provide an improved tape drive system for cartridge tape players.

It is another object of the invention to provide a compact tape drive system for a cartridge tape player which can be used in a player having a small vertical dimension, or thickness.

It is a further object of the present invention to provide a small direct current motor having a rotor with a permanent magnet structure which surrounds a wound stator.

It is a still further object of the invention to provide an improved direct current motor having an annular permanent magnet rotor structure which operates at a relatively high speed to provide a substantial rotary moment.

It is still another object of the invention to provide an improved tachometer pickup adapted to be coupled to the motor of a cartridge tape player for speed control of the drive.

The tape drive system of the invention, for use in an automotive cartridge tape player, includes a direct current motor having a stator with three Y connected windings and commutation to energize the windings in turn. The rotor includes a ring of permanently magnetized material which coaxially surrounds the stator. A drive wheel is secured to the rotor shaft and is tightly coupled by a drive belt to a reduction pulley which is connected to the tape drive capstan. The belt further passes around an idler roller and extends over more than half the circumferences of the drive wheel and reduction pulley for good frictional engagement.

A tachometer generator includes a ring gear of magnetic material secured to the rotor having alternate teeth and spaces adjacent a ring magnet having twice the number of magnetic segments as the number of teeth in the ring gear. Adjacent the ring magnet is a coaxial pickup coil in which current is induced having a frequency which is a function of the rotor speed. The coil is connected to a control circuit for controlling the speed of the motor in response to changes in the frequency of current induced in the pickup coil. The control circuit includes an operational amplifier having a negative feedback loop which includes a twin T filter which rejects a narrow band of frequencies. The operational amplifier provides a low output as the motor starts and the speed of the motor increases up to the desired speed, to allow the conduction of a transistor which supplies current from the direct current power supply to the motor. When the starting switch is closed, maximum current is supplied to the motor until the motor speed reaches the desired speed at which the negative feedback is reduced to increase the output of the amplifier and cut back the current supplied to the motor.

BRIEF DESCRIPTION OF THE DRAWINGS

FIG. 1 is a perspective view of a cartridge tape player utilizing the drive system of the invention;

FIG. 2 is a plan view in partial cross-section of the tape drive system of the present invention;

FIG. 4 is a plan view in partial cross-section of the motor of the tape drive system.

DETAILED DESCRIPTION

Figure 3:
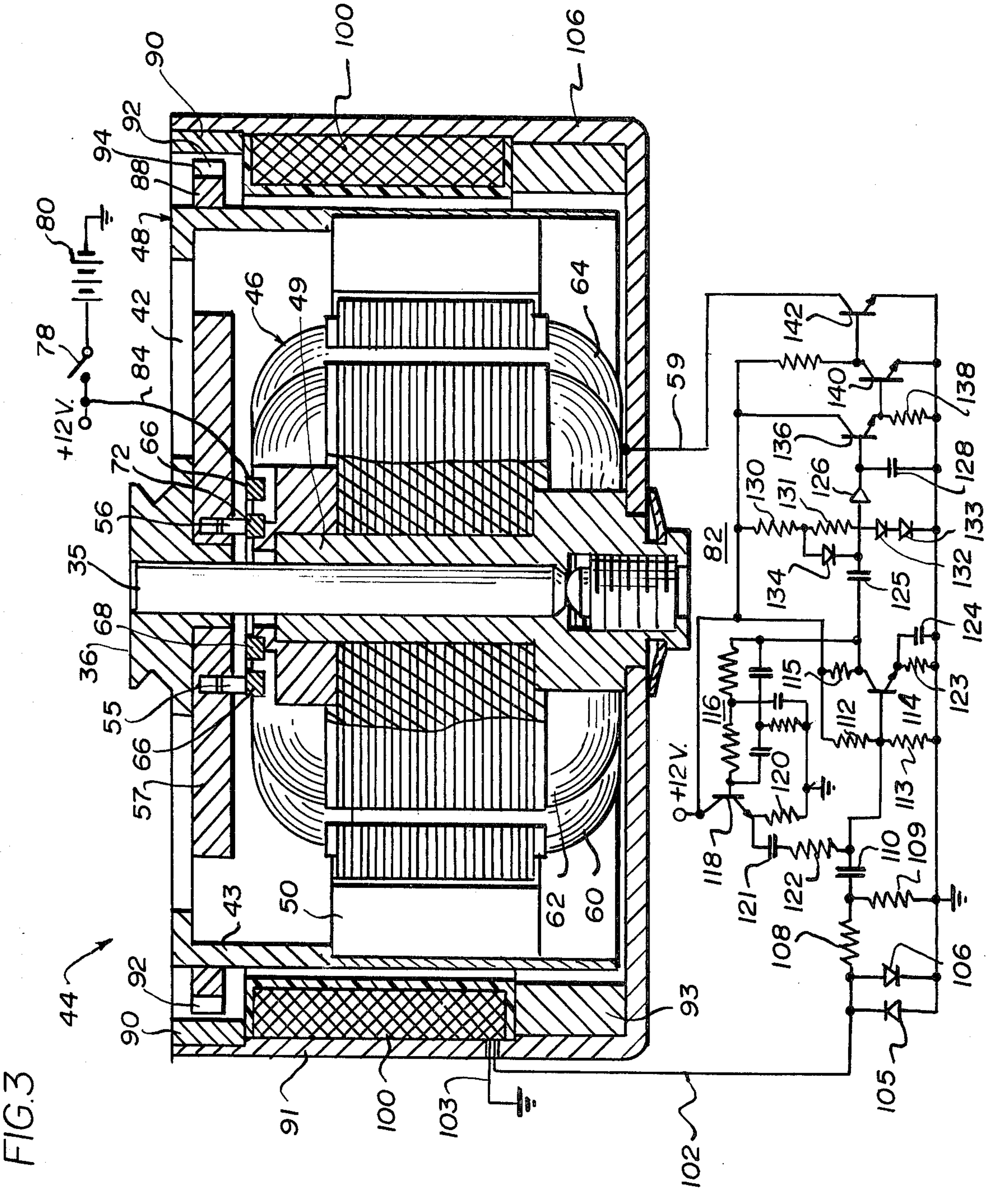
FIG. 3 is a view in partial cross-section of the motor and tachometer generator, and a schematic diagram of the control circuit for the motor.

The cartridge tape player of FIG. 1 has a housing 10 with an aperture 12 for receiving a tape cartridge 14. The housing 10 may be one and one-eighth inch thick (the vertical dimension denoted by the number 16 in FIG. 1), six and one-half inches wide (denoted by the number 18) and four and one-fourth inches deep (denoted by the number 20). Knobs 17 and 19 may provide tone, volume and on-off controls.

The drive system for the tape player is shown in FIG. 2, and includes a capstan 24, which is rotatably mounted with respect to the base 26 of the housing 10. With the tape cartridge 14 inserted in the aperture 12, the tape 28 therein engages the capstan 24 and the transducer head 30, with the pinch roller 32 within the cartridge maintaining the tape 28 in driving engagement with the capstan 24.

A square belt 34, which is made of a flexible material, such as reinforced rubber, couples the drive wheel 36 of the motor 44 to the reduction pulley 22. The capstan 24 is secured to and concentric with the pulley 22, and is driven thereby. An idler roller 38, which is connected to the base 26 by support arm 40, may be adjustably positioned to provide the proper tension in belt 34. The belt 34 extends about the motor drive wheel 36 over more than 180° of the circumference thereof, and extends about the capstan reduction pulley 22 over more than 270° of the circumference thereof to provide substantial frictional engagement therewith to provide tight coupling between the motor and the capstan.

The motor 44 (FIGS. 3 and 4) is energized by direct current and includes a stator 46 having three windings 60, 62, and 64 thereon, and a motor 48 with an annular permanent magnet 50 coaxially surrounding the stator. The rotor 48 includes a spider or top 42, which may be integral with the drive wheel 36, secured to motor shaft 35 which is mounted for rotation in the bearing 49 of the stator 46. The annular magnet 50 is supported by an annular rim 43 extending from the spider 42. A pair of brushes 55 and 56, which are electrically interconnected, are supported by plate 57 of the rotor, for engagement with the slip ring 66, and ring sections 68, 70 and 72 on the stator.

The stator 46 includes a laminated magnetic structure 58 (FIG. 4) which may be made of silicon steel, and has three legs 58a, 58b and 58c with the three windings 60, 62 and 64 wound on the respective legs. Each of the windings has one terminal connected to a common point 59 (FIG. 3), and a second terminal connected to one of the slip ring sections 68, 70 and 72, which are positioned in a circle axially displaced within the continuous slip ring 66 (FIG. 4). The slip ring sections 68, 70 and 72 are connected in turn to slip ring 66 by the interconnected brushes 55 and 56, when the rotor 48 rotates. Accordingly, the windings 60, 62 and 64 are connected in turn between the point 59 and the slip ring 66. Slip ring 66 is connected through conductor 84 and switch 78 to battery 80, and the common point 59 of the three windings is connected to the speed control circuit 82. consequently, by closing switch 78, the field windings are energized in turn from the battery 80 through the slip rings and brushes, as the rotor 48 turns.

The magnet 50 may be formed from a permanently magnetizable magnetic material, such as a magnetized ceramic or ferrite impregnated rubber, or some other material of high coercive force. The magnet 50 includes two opposite active portions 51 and 52, each of which may have an arcuate extent of the order of 130°, which are separated by inactive portions 53 and 54, which may have extents of the order of 50°. The portions 51 and 52 are magnetized radially so that one portion (51) has a south pole facing the rotor, and the other portion (52) has a north pole facing the rotor, to provide a magnetic field in which the windings 60, 62 and 64 operate. The magnetic field is completed through the annular rim 43 which is constructed of magnetic material. It will be apparent that the magnet portions 51 and 52 can be replaced by flat magnets having shaped pole pieces.

No flywheel is utilized in the present tape player drive. The reduction pulley 22 is positioned in the place normally occupied by a flywheel, but is much thinner than the usual flywheel so that little energy is stored thereby. The reduction pulley, 22, therefore, produces only slight flywheel effect. The motor 44, with the direct (no slippage) coupling from the drive wheel 36 thereof to the capstan pulley 22, provides a "flywheel effect" for the capstan of the tape player, and therefore eliminates the need for a separate flywheel, as will be explained.

The moment, i.e., the effective weight times the distance from the axis of rotation, and the rotational speed determine the amount of energy stored in the rotating structure of the motor. As the rotor 48 carries most of its weight in the rim 43 and magnet 50 around its periphery, it provides a moment arm approximating its radius, and a moment which is therefore substantially larger than the moment created by a uniformly weighted disc of the same weight. Secondly, the rotational velocity of the rotor 48 is substantially greater than that of the capstan 24 to which is flywheel is ordinarily connected in tape systems, to further increase the moment. The rotor 48, therefore, serves the purpose of a flywheel. The comparatively small, lightweight reduction pulley 22, which may be only one-sixteenth of an inch thick and approximately 2.5 inches in diameter, may be made of die cast metal. With the smaller motor and no flywheel, less torque is required to produce the same flywheel effect for maintaining constant tape speed. Because there is no flywheel, and less starting torque is required, the motor starts faster.

A tachometer generator, or speed sensing device, includes a gear or tooth wheel 88 (FIGS. 2 and 3) connected to the rotor 48 of the motor 44, which rotates within ring magnet 90 which is supported in housing 91. A pickup coil 100 is also supported in housing 91, and current is induced in this coil by the changing flux produced by rotation of wheel 88. The frequency of the induced current is dependent on the speed of rotor 48. Speed control circuit 82 is coupled to pickup coil 100 by lead 102 to control the motor speed in response to the frequency of the current induced in the pickup coil. A second lead 103 connects coil 100 to ground. The speed control circuit 82 is further connected to the common point 59 of the motor field windings, as has been explained.

The tachometer tooth wheel or ring gear 88, which is connected to the rotor 48, is made of soft magnetic material and includes a plurality of teeth 92 with spaces therebetween, 39 teeth for example. all the teeth are equal in size, as are the spaces, but the teeth and spaces need not be the same size. The magnet 90 which is adjacent the teeth of the ring gear 88 is divided into twice the number of magnetic segments (78) as there are teeth on the ring gear 88, with each segment having one half the arcuate extent as one tooth and one space. Each annular segment has poles of opposite polarity on opposing radial sides thereof, with adjacent segments being oppositely magnetized. The magnetic field extends from the magnet segment through the housing shell 91 and through a ring 93 of magnetic material, across an air gap to rim 43 of the rotor 48, and from the rim into tooth wheel 88 and across an air gap back to the magnet. When the teeth 92 are adjacent north poles of the magnet 90, the flux will surround the coil 104 in one direction, and as the teeth 92 move to south poles in magnet 90, the flux reverses. This produces an alternating current in coil 100.

Since there are a plurality of teeth on the ring gear, and a plurality of magnetic poles, averaging occurs for all of the teeth and all of the poles. Thus, the possibility of accumulated tolerance modulation of the signal in coil 104 resulting from eccentricities in the construction of either the ring gear 88 of the segment of the ring magnet 90 is reduced. The signal induced in coil 100 responds to incremental changes in motor speed when cause the teeth to move by the magnetic poles at different rates. For example, tooth 93 is adjacent magnet segment 94 (FIG. 2) at the same time that tooth 96 is adjacent segment 98. The rotation of the tooth wheel 88 to move the teeth from magnetic segments of one polarity to segments of the opposite polarity causes the magnetic flux set up by the magnet segments and which passes through the teeth, to reverse the magnetic field about the coaxial pickup coil 100 and induce an alternating current signal therein which varies in frequency with the incremental changes in speed. The alternating current signal from the pickup coil 100 is coupled through lead 102 to the control circuit 82, as previously stated.

it will be apparent that the tachometer will be operative even though the magnet 90 does not completely surround the wheel 88, but the output from coil 100 will be less if magnet segments are not provided adjacent each of the teeth 92 of the gear.

The circuit diagram of the control system 82 for the drive motor is shown in FIG. 3. The signal developed in coil 100 is applied across back-to-back diodes 105 and 106 which clip or limit the amplitude of the alternating current signal. The limited signal is applied across resistors 108 and 109 which form a voltage divider to provide the desired signal level. Resistors 108 and 109 may be replaced by a potentiometer for adjustment of the signal level. The output of the voltage divider is applied through blocking capacitor 110 to the base electrode of transistor 114. Resistors 112 and 113 provide a bias potential to the base of transistor 114. Transistor 114 amplifies the alternating current signal, with the amplified signal being developed across collector resistor 115. Resistor 123 and capacitor 124, connected between the emitter electrode of transistor 114 and ground, act to increase the stability of the amplifier stage.

To provide frequency selective action in the amplifier 114, a feedback circuit is provided including a twin-T filter network 116 which couples the signal from the collector electrode of transistor 114 to the base electrode of transistor 118. Transistor 118 is connected in an emitter follower circuit, with the output being developed across emitter-resistor 120 and applied through blocking capacitor 121 and resistor 122 back to the base electrode of transistor 114. The twin-T feedback network 116 may be of known construction, and it is designed to reject a narrow band of frequencies which includes the frequency of signals produced in the coil 100 of the tachometer when the motor is operating at the desired speed. In a tape drive system which has been constructed, the network is designed to reject the frequency of 1.365 kilohertz.

As the motor is energized and the speed builds up to the desired speed, the frequency of the signal from tachometer coil 100 will be below the frequency which is rejected by the filter network, so that a signal is fed back to the base of transistor 114 which opposes the signal from coil 100. Accordingly, the output signal at the collector of transistor 114, will be at a low value. The bias applied to the base of transistor 114 can be selected to provide the desired value. When the motor reaches the desired speed so that the frequency of the signal from the tachometer coil reaches the reject frequency of the filter network, substantially no signal will be applied to transistor 118 and its output will be substantially reduced, so that the negative feedback applied to the base of transistor 114 will be likewise reduced. This will allow transistor 114 to provide an increased output at its collector electrode.

A circuit is connected to the collector electrode of transistor 114 including capacitor 125, diode 126 and capacitor 128. A voltage divider string including resistors 130 and 131 and diodes 132 and 133 as has the junction between the resistors 130 and 131 coupled through diode 134 to the junction between the capacitor 125 and diode 126. This circuit forms an integrator and voltage doubler detector to develop a direct current control voltage across capacitor 128 in response to the alternating current signal at the collector electrode of transistor 114. The bias developed across diodes 132 and 133 varies with temperature and serves to provide temperature compensation for the diode 126 and the transistor 136 connected thereto. The transistor 136 serves as an emitter follower and provides a high impedance load for the detector. The control signal developed across emitter resistor 138 is applied to the base of transistor 140, which forms the driver stage for the output stage 142, which controls the current through the common conductor 59 of the field windings.

When the drive circuit is turned on by operation of switch 78, transistor 142 is fully conducting to supply current to the windings, with the current being applied in turn to the three windings by the commutating action of the brush 56 and the ring sections 68, 70 and 72. As previously stated, until the motor reaches the desired speed, the output transistor 114 will be low so that the detected voltage applied to the base of transistor 136 will also be low. Transistor 136 will therefore be nonconducting and driver transistor 140 will also be nonconducting, so that the output of transistor 142 will conduct fully. When the speed of the motor increases to the desired frequency, the filter network 116 will reduce the negative feedback to transistor 114 so that its output will be high. This will produce a sufficient detected voltage applied to the base of transistor 136 to render the same conducting, and to in turn render driver transistor 140 conducting. When the driver transistor 140 conducts, its collector electrode will be brought to ground potential to turn off the output transistor 142. This will reduce the current through the common terminal 59 to reduce the excitation applied to the field windings of the motor.

The drive system which has been described has been found to be highly effective when used in a cartridge tape player to drive the capstan which moves the tape. By use of a motor having a rotor with substantial moment, a separate flywheel is not required. The construction of the motor with a wound stator and a permanent magnet rotor which surrounds the stator provides a motor with a very small axial dimension and which provides the required torque. Inasmuch as a flywheel is not required, the pulley connected to the capstan for driving the same at reduced speed can be very thin. This makes it possible to use the drive system in a cartridge tape player which is not substantially thicker than the tape cartridge itself. The tachometer built with the motor provides a signal which responds to incremental changes in speed and makes it possible to hold the speed highly constant. Inasmuch as a flywheel is not involved, except for the flywheel effect of the motor itself, the speed control can be easily effected.

I claim:

1. A tape drive system for a cartridge tape player including in combination:

motor means having a stator and a rotor, and means supporting said rotor for rotation, said rotor operating at a first rotary speed and having a portion coaxially surrounding said stator which includes most of the weight of said rotor, capstan means, and means rotatably supporting said capstan means, and speed reducing means coupling said rotor to said capstan means for driving said capstan means at a rotary speed less than said first rotary speed, said rotor being of a construction and operating at a speed to provide a moment to store a predetermined amount of energy, and said capstan means being constructed and operating at a speed to provide a moment to store substantially less energy than said rotor, said speed reducing means applying the moment of said rotor to said capstan means to maintain the rotational speed of said capstan means substantially constant.

2. The tape drive system of claim 1 wherein said rotor includes an annular portion surrounding said stator which includes magnet means.

3. The tape drive system of claim 1 wherein said motor means comprises a direct current motor having a wound stator, and said rotor includes a permanently magnetized annular magnet which surrounds said stator.

4. The tape drive system of claim 1 wherein said speed reducing means includes a drive wheel connected to said rotor, a reduction pulley connected to said capstan, and a drive belt coupling said drive wheel to said reduction pulley.

5. The tape drive system according to claim 4 wherein said speed reducing means further includes an idler roller rotatably secured to said base and engaging said drive belt in a position to reduce side thrust from said drive wheel.

6. The tape drive system of claim 1 including a wheel of magnetic material having teeth thereon coupled to said rotor, magnetic means coaxial with said wheel, and coil means adjacent said magnetic means, whereby rotation of said wheel causes a current to be induced in said coil means having a frequency proportional to the speed of said rotor.

7. The tape drive system of claim 6 wherein said stator includes a magnetic structure with winding means thereon, and including control means coupled between said coil means and said winding means to control the speed of said motor means.

8. The tape drive system of claim 7 wherein said magnetic means includes a plurality of magnet segments about said wheel, and said coil means includes a pickup coil adjacent said magnet segments, said coil having an alternating current induced therein by rotation of said wheel.

9. The tape drive system of claim 8 wherein adjacent magnet segments have poles of opposite polarity and the number of magnet segments of each polarity equals the number of teeth on said wheel.

10. The tape drive system of claim 1 wherein said stator includes a magnetic structure with winding means thereon, and including means producing a signal having a frequency responsive to motor speed, and control means connected to said signal producing means and responsive to the signal therefrom for controlling the current to said winding means to thereby control the speed of said motor means.

11. The tape drive system according to claim 10 wherein said control means includes frequnecy selective amplifier means having an input and an output, said input being coupled to said signal producing means, and a current control stage having control and load electrodes, said load electrodes being coupled to said winding means of said motor means and said control electrode being coupled to said output of said amplifier means, said amplifier means being responsive to a predetermined frequency to operate said current control stage to control the current applied to said stator to cause said motor means to operate at a speed related to said predetermined frequency.

12. The tape drive system according to claim 11 wherein said amplifier means includes an operational amplifier and a negative feedback loop including a twin "T" filter connected to said operational amplifier.

13. The tape drive system according to claim 12 including detector means connected between said output of said operational amplifier and said control electrode of said current control stage.

14. In a tape drive system for a cartridge tape player having a base, a capstan rotatably secured to the base, a motor secured to the base and having a rotor with a drive wheel and a stator with winding means, and means coupling the drive wheel to the capstan, the combination including, speed sensing means coupled to the rotor and extending thereabout for producing an alternating current signal having a frequency varying with the speed of the motor, and control means coupled between said speed sensing means and the winding means of the motor to control the speed thereof in response to the signal produced by said sensing means, said control means including an operational amplifier having an input coupled to said sensing means and an output, negative feedback means coupled between said input and said output including a filter for rejecting a predetermined frequency, current control means having control and load electrodes with said load electrodes being coupled to the winding means to control the current therein, and integrator and rectifier means coupling said output to said control electrode and applying a direct current control voltage thereto in response to an applied alternating current signal, said amplifier providing an increased signal at said output in response to a signal of a predetermined frequency to cause the control voltage to increase, and said current control means responding to said increase in said control voltage to reduce the current applied to the winding means to control the motor speed.

15. The combination according to claim 14 wherein said sensing means includes a magnetic tooth wheel coupled to the rotor, magnetic means coaxial with said tooth wheel, and coil means coupled to said magnetic means, rotation of said tooth wheel inducing in said coil means a current having a frequency proportional to the speed of said rotor.

16. The tape drive system according to claim 15 wherein said magnetic means includes a ring magnet having a plurality of segments coaxially surrounding said tooth wheel, with adjacent magnet segments having magnetic poles of opposite polarities, and the number of poles of each polarity being the same as the number of teeth in said tooth wheel.

17. A motor drive system including in combination:

motor means having a stator and a rotor, and means supporting said rotor for rotation, said rotor operating at a first rotary speed and having a portion coaxially surrounding said stator which includes most of the weight of said rotor, shaft means, and means rotatably supporting said shaft means, and speed reducing means coupling said rotor to said shaft means for driving said shaft means at a rotary speed less than said first rotary speed, said rotor being of a construction and operating at a speed to provide a moment to store a predetermined amount of energy, and said shaft means being constructed and operating at a speed to provide a moment to store substantially less energy than said rotor, said speed reducing means applying the moment of said rotor to said shaft means to maintain the rotational speed of said shaft means substantially constant.

18. The drive system of claim 17 wherein said motor means includes a direct current motor having a wound stator, and said rotor includes a permanently magnetized annular magnet which surrounds said stator.

19. The drive system of claim 17 wherein said speed reducing means includes a drive wheel connected to said rotor, a reduction pulley connected to said drive shaft, a drive belt coupling said drive wheel to said reduction pulley, and an idler roller engaging said drive belt in a position to reduce side thrust from said drive wheel.

20. The drive system of claim 17 further including a wheel of magnetic material having teeth thereon coupled to said rotor, magnetic means coaxial with said wheel providing a flux path which includes said wheel, and coil adjacent said magnetic means, whereby rotation of said wheel varies the flux in said flux path and causes a current to be induced in said coil means having a frequency proportional to the speed of said rotor.

21. The drive system of claim 20 wherein said stator includes a magnetic structure with winding means thereon, and further including control means coupled between said coil means and said winding means to control the speed of said motor means.

22. The drive system of claim 21 wherein said magnetic means includes a plurality of magnet segments about said wheel, and said coil means includes a pickup coil adjacent said magnet segments, with said coil having an alternating current induced therein by rotation of said wheel.

23. The drive system of claim 17 wherein said stator includes a magnetic structure with winding means thereon, and further including means producing a signal having a frequency responsive to motor speed, and control means connected to said signal producing means and responsive to the signal therefrom for controlling the current to said winding means to thereby control the speed of said motor means.

24. The drive system according to claim 23 wherein said control means includes frequency selective amplifier means having an input and an output, said input being coupled to said signal producing means, and a current control stage having control and load electrodes, said load electrodes being coupled to said winding means to said motor means and said control electrode being coupled to said output of said amplifier means, said amplifier means being responsive to a predetermined frequency to operate said current control stage to control the current applied to said stator to cause said motor means to operate at a speed related to said predetermined frequency.

* * * * *

UNITED STATES PATENT AND TRADEMARK OFFICE

CERTIFICATE OF CORRECTION

PATENT NO. : 3,915,365

DATED : October 28, 1975

INVENTOR(S) : Melvin A. Lace

It is certified that error appears in the above-identified patent and that said Letters Patent are hereby corrected as shown below:

Column 3, line 51, change "consequently" to --Consequently--.

Column 4, line 26, change "is", first occurrence, to --the--.

Column 4, line 57, after "The", second occurrence, insert --ring--.

Column 5, line 3, change "104" to --100--.

Column 5, line 11, change "104" to --100--.

Column 5, line 12, change "of", second occurrence, to --or--.

Column 10, line 8, after "coil" insert --means--.

Column 10, line 37, change "to" to --of--.

Signed and Sealed this

*second* Day of *March 1976*

[SEAL]

*Attest:*

RUTH C. MASON
*Attesting Officer*

C. MARSHALL DANN
*Commissioner of Patents and Trademarks*